Patented July 26, 1938

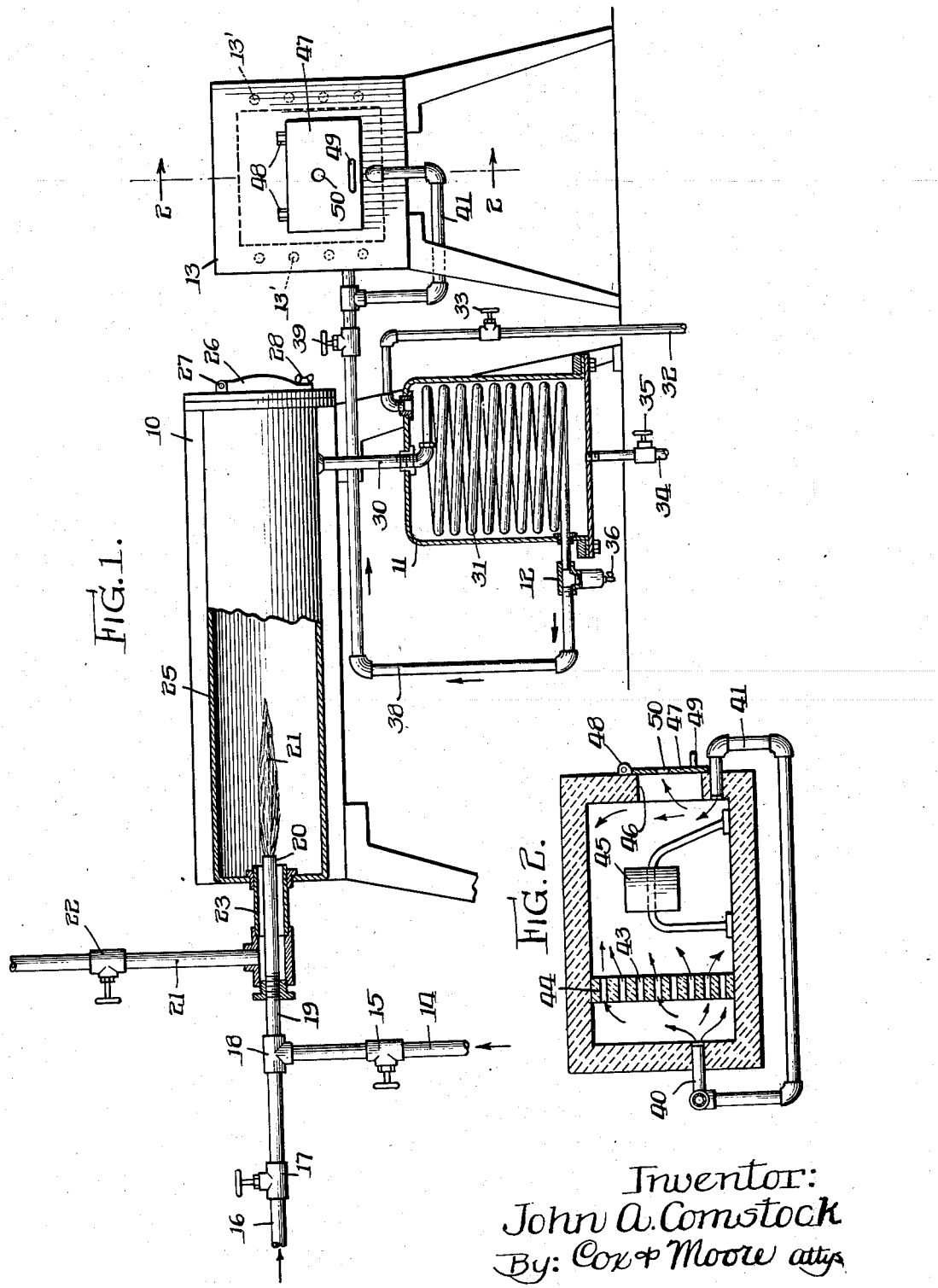

2,124,764

UNITED STATES PATENT OFFICE 2,124,764

METHOD AND APPARATUS FOR PRODUCING NEUTRAL ATMOSPHERE IN HEAT TREATING FURNACES

John A. Comstock, Chicago, Ill., assignor to Illinois Tool Works, Chicago, Ill., a corporation of Illinois Application March 25, 1935, Serial No. 12,761

4 Claims. (Cl. 148—16)

The present invention relates to an improved method and apparatus for producing neutral atmosphere in heat treating furnaces.

In the heat treatment of metals it is desirable to surround them during the treating operations with a protective neutral atmosphere, that is, an atmosphere which is non-oxidizing and non-decarburizing even at the high temperatures to which the metals are subjected during the treatment processing. By this means the surface of the metal is preserved during the treating process, scaling and pitting being avoided, thus eliminating the necessity of machining the work after the heat treating thereof. Such protection of the work with a neutral atmosphere during its heat treatment may be best carried out in an electric furnace or a furnace of the muffle type, wherein the work is not in direct contact with the heating gases or other heat medium.

It is an object of the present invention to provide for the continuous introduction of a neutral atmosphere of mixed gases into a furnace of the electric or muffle type, and to provide means for readily and accurately controlling the atmosphere so introduced, both as to quantity and as to the quality or proportioning of the gases of which the atmosphere is composed.

More particularly, it is an object of the invention to provide for the introduction of an atmosphere which is neither oxidizing nor decarburizing with respect to tungsten and molybdenum high speed steels, or like metals, at temperatures of from 2000 to 2500 degrees F. and the like.

In accordance with the invention, a gas such as fuel gas is cracked by direct contact with a gas-air flame, the cracking process being facilitated by the presence of a suitable catalytic agent. The cracked gas is mixed with the products of combustion of the gas-air flame and the neutral mixed gas atmosphere resulting is introduced into the heat treating furnace, the mixture being first cooled and dehydrated. Means are provided for accurately controlling the proportioning of the gas and air directed to the gas-air flame and for controlling the amount of auxiliary gas to be cracked, and means is also provided at the heat treating furnace for indicating the character and quantity of the gases being introduced thereto.

Accordingly, further objects of the invention are to provide a suitable apparatus and method for conditioning any form of fuel gas or the like to obtain a suitable desired mixed gas for use in controlled quantity when and where it may be required; more specifically, to provide for the reconditioning or cracking of a gas by direct contact with a gas-air flame, and to provide in such an arrangement means for accurately controlling the proportioning of gas and air delivered to the gas-air flame, and the quantity of the auxiliary gas to be cracked, whereby to readily vary and control the proportioning of the constituent gases and the quality of the neutral mixed gas atmosphere provided.

Still further objects of the invention are to provide means for indicating the quantity and quality of the neutral gas mixture supplied to the heat treating furnace, means for subjecting the gases during the cracking process to a suitable catalytic agent, and means for removing from the gases, prior to their introduction to the heat treating furnace, excess moisture.

Other objects and advantages of the invention will be apparent from the following description when taken in connection with the accompanying drawing, wherein there is disclosed one preferred form of apparatus for carrying out the invention.

In the drawing, wherein like reference numerals refer to like parts throughout,

Fig. 1 is a general assembly view, partially in section, of the apparatus included in the system, and Fig. 2 is a sectional view through the heat treating furnace taken substantially along the line 2—2 of Fig. 1.

As best indicated in Fig. 1, the preferred form of apparatus shown for purposes of illustration of the invention, comprises generally a combustion or cracking furnace 10, a cooling chamber 11, a water trap or removal device 12, and a heat treating furnace 13.

As indicated, the combustion or cracking furnace has connected to one end thereof, the piping system through which the gas and air for the gas-air flame and the auxiliary gas to be cracked are introduced into the furnace. The combustion fuel gas for the gas-air flame is introduced through pipe 14 connected with a suitable source of fuel gas supply. The valve 15 provides a suitable means for accurately controlling the flow of the combustion gas. Air for the gas-air flame is introduced through the pipe 16 controlled by the valve 17. The air and combustion gas are mixed at pipe union 18 from which they are directed through pipe 19. The pipe 19 terminates in a burner 20 which extends into the end of the combustion furnace 10. The auxiliary fuel gas to be cracked is introduced through pipe 21, controlled by valve 22, to a conduit 23 which surrounds the burner pipe 20. The flame 21, formed by the combustion of the gas-air, is confined to the central portion of the combustion furnace and the auxiliary gas to be cracked is introduced around the entire gas-air flame, thus forming a muffle or blanket around the flame in direct contact therewith. Being in direct contact with the gas-air flame, the auxiliary gas is cracked by direct convection with and conduction from the products of combustion of the gas-air flame, as well as by radiation.

The combustion furnace in the preferred embodiment illustrated comprises an elongated tubular construction, as such form of combustion chamber is well suited to the purpose of the invention. However, other suitable forms of combustion chamber could be employed. The lining 25 of the combustion furnace is preferably composed of heat resisting nickel alloy. The nickel acts as a catalytic agent in the cracking process and greatly facilitates the cracking action of the gas-air flame. If desired, heat-resisting metal other than a nickel alloy could be used for the combustion furnace lining, in which event the nickel catalytic agent could be introduced in the form of a wire screen or plate, or series of bars, secured to the furnace lining adjacent the gas-air flame where the major portion of the cracking process is carried out. The end of the combustion furnace opposite the burner 20 is closed by means of a cover plate 26 pivoted at 27, and normally held in closed position by means of thumb clamp 28. By manipulation of the thumb clamp the cover 26 may be swung or raised about the pivot 27 to allow access to the interior of the combustion furnace.

The products of combustion of the gas-air flame and the cracked auxiliary gas are mixed within the combustion furnace and conducted therefrom by means of pipe 30 to a coil 31 within the cooling chamber 11. The cooling chamber 11 is preferably water cooled, the water being introduced through inlet conduit 32 controlled by valve 33, and being exhausted from the chamber by means of outlet conduit 34 controlled by valve 35. The valves 33 and 35 provide means for controlling the amount of the cooling water, and in the normal operation of the system the cooling chamber is kept cold and substantially full of water so that a maximum cooling of the neutral gases is effected. The gases are cooled in their circulation through coil 31 within the cooling chamber and the water therein. In the cooling of the gases within the coil the moisture therein is condensed. This moisture is removed from the gases by means of the water trap 12 which is located in the conduit line at the lower end of the cooling coil 31. The collected water may be drained from time to time from the water trap 12 by means of pet cock 36.

From the cooling coil and water trap the neutral gases are directed by means of pipe line 38 to the heat treating furnaces 13. A single combustion furnace or cracking unit may be used in connection with an entire battery of heat treating furnaces, the neutral gases being conducted from supply pipe 38 to the entire battery of heat treating furnaces through suitable piping connections. In the drawing but a single heat treating furnace is shown, but it is to be understood that any desired number could be connected to the cracking unit. The heat treating furnaces may be any suitable form of electric furnace or muffle type furnace. In the drawing, elements 13' imbedded in the walls of the furnace indicate either electric heat coils in the case of an electric furnace or the heating combustion tubes in the case of a muffle type furnace.

The volume of the neutral gas introduced into the furnace is controlled by means of valve 39. As best seen by reference to Fig. 2, the mixed gases constituting the neutral atmosphere are introduced into the heat treating furnace both through the rear thereof by means of pipe 40 and through the front by means of pipe 41. The gases introduced to the rear of the furnace pass through openings 43, formed in a barrier wall 44 across the rear part of the furnace. A considerable number of openings 43 are provided and by means of them a continuous blanket of neutral atmosphere is passed across the work piece 45, suitably supported within the furnace interior. The opening 46 in the front of the furnace, through which access to the furnace interior is had, is closed by means of a cover plate 47 hinged at 48 and provided with a suitable operating handle 49. An opening 50 is cut through the cover plate, and the neutral gases introduced into the furnace interior are discharged through this opening. The neutral gases introduced to the front of the furnace through the pipe 41 provide a protecting blanket across the face of the work when the cover plate 47 is raised for any purpose, as for the inspection of the work or for its insertion or removal. That is, the gases introduced in the front of the furnace through pipe 41 form a continuous protecting blanket across the opening 46 which prevents outside air from finding its way into the furnace. Further, the introduction of the neutral gases into the furnace takes place at a slight pressure, which pressure further aids in excluding outside atmosphere from the furnace both when the cover plate 47 is opened and when it is closed.

The gases being discharged through opening 50 serve as an indicator for the conditions within the furnace. This is due to the fact that the neutral gases, though non-oxidizing or decarburizing to even the most readily oxidized or decarburized metals, burn freely when mixed with air in sufficient quantities. The gases issuing from opening 50 are ignited and the character of the flame produced indicates the character or quality of the gases being introduced to the heat treating furnace. The size of the flame shows the gas pressure.

In use and in starting the apparatus, the cover plate 26 is first opened so that access may be had to the interior of the combustion furnace. The valves 15 and 17 are then opened, producing a gas-air mixture at the burner 20 which may be readily ignited through the open end of the combustion furnace. At this time the valve 22 controlling the introduction of the auxiliary fuel gas to be cracked is closed, the valve 39 controlling the introduction of the gases to the heat treating furnace is likewise closed, and the cover plate 26 is left open. The combustion furnace is conditioned by permitting the gas-air flame to burn sufficiently to bring the nickel alloy heat-resisting lining 25 to a red heat. In practice this may require an hour or so. When the combustion furnace is thus conditioned the cover plate 26 is closed and secured by thumb screw 28, and valves 22 and 39 are opened. The valves 33 and 35 are also adjusted so that cooling water flows through the cooling chamber 11. The valves 15 and 17 controlling the mixture for the gas-air flame are adjusted so that a maximum of gas is introduced with respect to the air, an amount just short of that which will cause a blowing off of the flame at the burner. A blowing off at the burner causes the gas flame emitted through the opening 50 in cover plate 47 to flicker. In adjusting the valves therefor, valve 15 emitting the combustion gas may be opened until a flicker is produced in the indicating gas flame. The valve is then closed until the flicker disappears. At this point the gas introduced in proportion to the air will be just short of that causing a blowing off at the burner. With this adjustment of valves 15 and 17, valve 22 is opened until incandescent carbon particles are visible in the indicator flame. The valve is then closed just sufficiently to cause the incandescent particles to disappear and the indicator flame to show a blue clean flame. The above adjustment of the valves produces a very satisfactory mixed gas neutral atmosphere for the treatment of most metals, including those such as tungsten and molybdenum high speed steels which are readily susceptible to surface oxidation or decarburization. However, the proportioning of the various constituent gases in the neutral gas atmosphere may be readily and accurately controlled by means of the several valves. The valves 15 and 17 may be manipulated to produce the most satisfactory air-gas flame without in any way disturbing the supply of the auxiliary gas to be cracked. Likewise, the supply of the auxiliary gas may be varied and controlled without disturbing the proportioning of the air and combustion gas, or disturbing the character of the air-gas flame. By this means a very accurate and flexible control of the operating conditions of the system may be effected. If the neutral atmosphere were produced merely by the mixture of air and combustion gas, without the introduction of the auxiliary gas to be cracked, the control of the mixture could be effected only by varying the character of the gas flame, an arrangement which has a considerable number of disadvantages. In accordance with the present invention the character of the flame and the quantum of the auxiliary gas to be cracked may be independently controlled, each may be varied without disturbing the other.

Within the combustion furnace 10 the gas to be cracked is brought into direct contact with the gas-air flame, whereby the cracking is effected by convection and conduction as well as by radiation, the auxiliary gas forming a complete muffle around the air-gas flame. In the cracking of the auxiliary gas methane and like higher hydrocarbons, common constituents of many fuel gases, are broken up and the hydrogen content of the gases is increased. A very desirable neutral atmosphere of mixed gases is produced and, by means of the valve control arrangements previously discussed, the proportioning of the various constituent gases in the mixed gas atmosphere may be accurately controlled to produce a neutral atmosphere best suited to the requirements of the particular metals being heat treated.

The neutral atmosphere of mixed gases supplied to the heat treating furnaces comprises both the products of combustion of the gas-air flame and the products into which the auxiliary fuel gas is cracked, and these may be readily and accurately controlled and proportioned to produce the most desired operating conditions. The cracking process is aided by the catalytic agent. The volume of gas introduced to the individual heat-treating furnace may be readily controlled by means of valve 39. Excess moisture is removed from the gases by means of water trap 12. A complete protective blanket of neutral gases is provided within the heat-treating furnace and this protective atmosphere is not disturbed even when the furnace door is open for the insertion or removal of work pieces. The gas flame issuing through opening 50 furnishes a convenient medium for indicating the conditions of the neutral gas within the furnace.

It is obvious that various modifications may be made in the specific apparatus shown and described, and in the several method steps set out in illustration of the invention without departing from the spirit thereof. I therefore do not wish to be limited to the precise constructions and method steps hereinbefore shown and described, but only as indicated in the following claims.

I claim:

1. In a heat treating unit, a combustion fuel gas supply conduit, an air supply conduit, a burner pipe connected to said supply conduits and terminating in a burner portion within a combustion furnace, an auxiliary fuel gas supply conduit surrounding said burner pipe and also terminating within said combustion furnace, means for independently controlling the flow of combustion fuel gas, air, and auxiliary fuel gas, a cooling coil, conduit means connecting the combustion furnace and the cooling coil, a water trap, a conduit connecting the water trap and the cooling coil, a heat-treating furnace, and a conduit connecting the water trap and the heat-treating furnace, valve control means in said last-named conduit, said last-named conduit being connected to the furnace interior at opposite ends thereof, and an exhaust opening formed in said furnace.

2. The method of supplying protective gases to heat treating furnaces which comprises mixing a hydrocarbon fuel gas and air in the proper proportions to support combustion and controlling the mixture of hydrocarbon gas and air to produce a flame of predetermined character, passing the mixture to a burner, igniting the mixture at the burner to form a gas-air flame, cracking an auxiliary hydrocarbon fuel gas by introducing it as a blanket about the gas-air flame and directly in contact therewith and in the presence of the products of combustion of the gas-air flame, and supplying the gaseous mixture so formed to the heat treating furnace to provide an enveloping atmosphere therein.

3. The method of supplying protective gases to heat treating furnaces which comprises mixing a hydrocarbon fuel gas and air in the proper proportions to support combustion and controlling the mixture of hydrocarbon gas and air to produce a flame of predetermined character, passing the mixture to a burner, igniting the mixture at the burner to form a gas-air flame, surrounding the gas-air flame with a muffle of auxiliary hydrocarbon fuel gas to be cracked, said surrounding hydrocarbon gas being in direct contact with the flame and the products of combustion thereof, contacting the auxiliary gas muffle with hot nickel during the cracking process, and supplying the cracked gaseous products substantially directly to the heat treating furnace to provide an enveloping atmosphere therein.

4. The method of heat treating high speed molybdenum steels which comprises mixing a hydrocarbon fuel gas and air in the proper proportions to support combustion and controlling the mixture of hydrocarbon gas and air to produce a flame of predetermined character, passing the mixture to a burner, igniting the mixture at the burner to form a gas-air flame, cracking an auxiliary hydrocarbon fuel gas by introducing it as a blanket about the gas-air flame and in direct contact with the gas-air flame and in the presence of the products of combustion thereof, cooling the resulting gaseous mixture, dehydrating said mixture, and conveying the cooled dehydrated mixture substantially directly to a heat treating chamber as an enveloping atmosphere for the material to be heat treated.

JOHN A. COMSTOCK.